United States Patent
Isupova et al.

(10) Patent No.: US 6,489,264 B1
(45) Date of Patent: Dec. 3, 2002

(54) AMMONIA OXIDATION CATALYST

(75) Inventors: Lubov Alexandrovna Isupova; Vladislav Alexandrovich Sadykov; Olga Ivanovna Snegurenko, all of Novosibirsk; Evgeny Abramovich Brushtein, Moscow; Tatyana Viktorovna Telyatnikova, Moscow; Valery Vasilievich Lunin, Moscow, all of (RU)

(73) Assignee: Institut Kataliza Imeni G.K., Boreskova (RU)

( * ) Notice: Subject to any disclaimer, the term of this patent is extended or adjusted under 35 U.S.C. 154(b) by 0 days.

(21) Appl. No.: 09/380,915

(22) PCT Filed: Oct. 6, 1997

(86) PCT No.: PCT/RU97/00313

§ 371 (c)(1), (2), (4) Date: Sep. 10, 1999

(87) PCT Pub. No.: WO98/40160

PCT Pub. Date: Sep. 17, 1998

(30) Foreign Application Priority Data

Mar. 12, 1997 (RU) ............................................. 97103800

(51) Int. Cl.$^7$ ........................... B01J 23/00; B01J 23/32; B01J 23/40; B01J 23/42; B01J 23/58

(52) U.S. Cl. ................. 502/302; 502/303; 502/304; 502/305; 502/306; 502/308; 502/312; 502/313; 502/314; 502/315; 502/316; 502/318; 502/319; 502/320; 502/323; 502/324; 502/326; 502/327; 502/328; 502/331; 502/332; 502/335; 502/336; 502/337; 502/338; 502/340; 502/341; 502/345; 502/346; 502/349; 502/353; 502/354; 502/355

(58) Field of Search .................. 502/302–306, 502/308, 312, 313–316, 318–320, 323–324, 326–328, 331, 332, 335–338, 340, 341, 345, 346, 349, 353, 354, 355; 423/594, 595, 596, 599, 600

(56) References Cited

U.S. PATENT DOCUMENTS

| | | | | |
|---|---|---|---|---|
| 4,049,583 A | * | 9/1977 | Lauder | 252/466 PT |
| 4,143,120 A | * | 3/1979 | Sermon | 423/239 |
| 4,788,174 A | * | 11/1988 | Arai | 502/324 |
| 4,812,300 A | | 3/1989 | Quinlan et al. | |
| 4,959,339 A | * | 9/1990 | Arai | 502/302 |
| 4,968,661 A | * | 11/1990 | Teller et al. | 502/304 |
| 5,242,882 A | | 9/1993 | Campbell | |
| 5,834,394 A | * | 11/1998 | Chen et al. | 502/302 |
| 5,965,481 A | * | 10/1999 | Durand et al. | 502/304 |

FOREIGN PATENT DOCUMENTS

| | | |
|---|---|---|
| DE | 3126675 C2 | 8/1982 |
| EP | 0562567 A1 | 9/1993 |
| FR | 2119121 | 8/1972 |
| RU | 641985 | 1/1979 |
| RU | 1220193 | 2/1984 |
| RU | 1153981 | 5/1985 |
| RU | 1759446 A1 | 9/1992 |
| RU | 2063267 | 7/1996 |

\* cited by examiner

Primary Examiner—Steven Bos
Assistant Examiner—Cam N. Nguyen
(74) Attorney, Agent, or Firm—Ostrolenk, Faber, Gerb, & Soffen, LLP

(57) ABSTRACT

A catalyst for oxidation of ammonia is of the general formula $(A_xB_yO_{3z})_k(ME_mO_n)_f$, wherein: A is a cation of Ca, Sr, Ba, Mg, Be, La or mixtures thereof, B is cations of Mn, Fe, Ni, Co, Cr, Cu, V or mixtures thereof, $x=0-2$, $y=1-2$, $z=0.8-1.7$; $Me_mO_n$ is an aluminum oxide and/or oxide of silicon zirconium, chromium, aluminosilicates, oxides of rare earth elements (REE) or mixtures thereof, $m=1-3$, $n=1-2$, k and f are % by weight, with the ratio $f/k=0.01-1$. The catalyst may be granules of different configuration, including blocks of honeycomb structure. The catalyst is thermally stable, resistant to thermal shocks. There is no water runoff.

8 Claims, No Drawings

AMMONIA OXIDATION CATALYST

BACKGROUND OF THE INVENTION

The invention relates to catalysts for the process of oxidizing ammonia.

At present, platinum and its alloys with palladium and rhodium are the main industrial catalysts for oxidizing ammonia. Taking the high cost of metals of the platinum group into account, the problem of how to reduce the use and losses of platinoids becomes important. Several compositions of oxide catalysts have been developed in which ferric oxide, chromium oxide, cobalt oxide, or bismuth oxide are the active component.

An oxide catalyst is known which is prepared by mixing aluminum, ferric, calcium and chromium oxides, and subsequently tableting and calcining at 875–900° C. (SU N 641985, 1979).

A catalyst for oxidizing ammonia is also known which comprises, % by weight, 90–95 ferric oxide and 5–10 chromium oxide, and is prepared by mixing ferric nitrates and chromium, curing at 315° C., cooling, mixing with graphite and subsequently tableting and calcining at 560–650° C. (Patent FR No. 2119121, 1972).

An oxide catalyst is known, which is prepared in the form of tablets and consists of ferric oxide and aluminum oxide (SU No. 1220193, 1986). The method for preparing the catalyst consists of mixing ferric oxide and aluminum hydroxide in an acidic medium, with subsequent thermal decomposition of the catalytic mass at 600–700° C., grinding, tableting and caking the prepared tablets. Its serviceability in the second step of ammonia oxidation was shown in pilot tests.

Drawbacks of such catalysts are a substantial gas dynamic resistance of the catalyst layer, a change in the phase composition during service, and the presence of ammonia in the gas flow after the catalyst layer.

A catalyst having a perovskite structure for the selective oxidation of ammonia into nitrogen oxide with a yield of at least 90% is selected as the prototype (U.S. Pat. No. 4,812,300, 1989). Powders of perovskites of the series $La_{1-x}Sr_xMeO_3$, where Me=Co, Mn, and x=0.25–0.75, and $LaMeO_3$, where Me=Co, Mn, Ni, Cr, Fe, were obtained by the method of coprecipitating tetraethyl ammonium from diluted solutions of nitrates taken in appropriate ratios and tested in a reaction of ammonia oxidation (samples were 0.005–0.1 g) at temperatures of from 500 to 1050 K and rates of the gas flow (1.5% by volume of $NH_3$, 5% by volume of $O_2$, balance helium) from 1000 to 10000 $h^{-1}$. However, in order to be used for industrial purposes, the catalyst should be formed into granules. The powders obtained by the coprecipitation method are not only not formed into honeycomb structures, but not into simple granules either.

SUMMARY OF THE INVENTION

The object of the present invention is to develop a high-strength, granulated catalyst, including a block catalyst having a honeycomb structure, for oxidizing ammonia, the catalyst having high activity, resistance to thermal shocks, not containing noble metals and making it possible to enhance the safety of the process by reducing the hydraulic resistance of the catalyst layer and stabilizing the gas flow.

The object is attained by using a catalyst in the reaction of oxidizing ammonia, which is a makeup of mixed oxides of the general formula $(A_xB_yO_{3z})_k (Me_mO_n)_f$, wherein: A is a cation of Ca, Sr, Ba, Mg, Be, La or mixtures thereof, B is cations of Mn, Fe, Ni, Co, Cr, Cu, V or mixtures thereof, x=0–2, z=0.8–1.7; $Me_mO_n$ is aluminum oxide and/or oxide of silicon, zirconium, chromium, aluminosilicates, oxides of rare earth elements (REE) or mixtures thereof, m=1–3, n=1–2, k and f are % by weight, with the ratio f/k=0.01–1.

Pure oxides and also an undivided mixture (metal mixture) of oxides of rare earth elements of the following composition, % by weight, may be used as oxides of REE: lanthanum oxide—30–33, ceryl oxide—45–55, praseodymium oxide—5–6, neodymium oxide—10–13, samarium oxide mol,—1–2, balance lanthanides—not more than 1. Zirconium oxide additionally comprises an alkaline-earth metal, wherein the ratio of zirconium to the alkaline-earth metal in zirconium oxide is 9:1.

The catalyst may be made up of granules of different configuration, including blocks of honeycomb structure.

The method of preparing the catalyst consists of the following steps:

1) Preparing a powder of $A_xB_yO_{3z}$ oxide.

Oxides of the $A_xB_yO_{3z}$ series are prepared by the method of mechanochemical synthesis (L. Isupova, V. Sadykov, L. Solovyova / Monolith Perovskite Catalysts of Honeycomb Structure for Fuel Combustion // Scientific Basis for the Preparation of Heterogeneous Catalysts. 6th Int. Symp., Louvain-la-Neuve (Belgium), 1994, v. 2, p. 231]. In order to do this, the mixture of initial simple oxides, hydroxides or carbonates, taken in appropriate ratios, is subjected to mechanochemical activation, and then the powder is calcined at 600–800° C. for 2–4 hours. The specific surface of the prepared complex oxides is 10–20 $m^2/g$.

2) Mixing and forming.

Powder of the oxide according to 1) is mixed in a powder mixer with compounds providing, during calcining, oxides of Al, Cr, Si, Zr, REE or with aluminosilicates in an acidic medium. In order to enhance the resistance of the catalyst to thermal shocks, reinforcing aluminosilicate fibers may be additionally introduced into the composition of the paste during the mixing step. Used as the Al-comprising adhesive agent are: aluminum oxynitrate or pseudoboehmite; Cr-comprising—chromic acid; Si-comprising—kaolin; Zr-comprising—zirconium oxynitrate; Ln-comprising—lanthanide nitrates. In order to enhance the rheological characteristics of the paste, surfactants—ethylene glycol, polyethylene oxide, carboxymethyl cellulose, polyvinyl alcohol, glycerin, etc.—are added to the composition. Granules or blocks of honeycomb structure are formed from the obtained paste.

3) Thermal treatment.

The catalysts are dried at a final temperature of 120° C., then calcined in air at 700–1100° C. for 2–4 hours.

DETAILED DESCRIPTION OF THE INVENTION

The proposed invention is illustrated by the following examples of preparing catalysts and by the results of their tests in an ammonia oxidation reaction, these results being presented in a table.

A chemical analysis of the catalysts is carried out with the flame photometry method, phase analysis—with X-ray methods, the specific surface is determined with the Bett's process, the catalytic activity in the ammonia oxidation reaction is determined for the fraction of catalysts at temperatures of 850–950° C. in a flow-through type installation.

The main part of the installation is a quartz reactor provided with devices for arrangement of a catalytic system (a platinoid grid and oxide catalyst) and with sampling points. Tests were carried out for a 2–5 mm catalyst fraction with a 35 mm height of the catalyst layer in the presence of 1 platinum grid or without a grid. The selectivity of the catalyst is determined by a chemical method—by passing discharge gases through an alkaline solution. The selectivity of oxidation on one platinum grid is 83–86%. The test temperature—T, ° C., and the linear speed of the gas flow—V, m/s, are varied. The concentration of ammonia in the air is 10% by volume. The remaining ammonia (the so-called break-through ammonia) is determined by means of the Keldal apparatus. Break-through ammonia was not detected.

EXAMPLE 1

A mixture of oxides of lanthanum, calcium and manganese with an atomic ratio of 0.9:0.1:1 is subjected to mechanochemical activation, calcined at 700° C. Pseudoboehmite, a solution of acetic acid, aluminosilicate fiber, and ethyleneglycol are added to the prepared powder $Ca_{0.1}La_{0.9}MnO_3$. The total moisture of the paste is 26%. Blocks of honeycomb structure are formed, dried, and calcined. The composition of the catalyst, % by weight, is: $(Ca_{0.1}La_{0.9}MnO_3)$—90, $Al_2O_3$—8, $SiO_2$—2. The catalyst bears at least 25 cycles of rapid heating to 700° C. and cooling to room temperature without cracking, i.e. is resistant to thermal shocks.

EXAMPLE 2

A mixture of calcium and manganese oxides with an atomic ratio of 1:1 is subjected to mechanochemical activation, calcined at 800° C. Kaolin, a solution of nitric acid, and polyethylene oxide are added to the prepared powder. The total moisture of the paste is 24%. Blocks of honeycomb structure are formed, dried and calcined. The composition of the catalyst, % by weight, is: $CaMnO_{2.95}$—60, $Al_2O_3$—30, $SiO_2$—10. The catalyst bears at least 25 heating-cooling cycles.

EXAMPLE 3

A mixture of calcium carbonates, lanthanum and ferric oxide with an atomic ratio of 0.5:0.5:1 is subjected to mechanical activation, calcined at 800° C. A solution of zirconium oxynitrate, and carboxymethyl cellulose are added to the prepared powder $Ca_{0.5}La_{0.5}FeO_{2.9}$. The total moisture of the paste is 28%. Blocks of honeycomb structure are formed, dried and calcined. The composition of the catalyst, % by weight, is: $Ca_{0.5}La_{0.5}FeO_{2.9}$—95, $ZrO_2$—5. The catalyst is resistant to thermal shocks.

EXAMPLE 4

A mixture of calcium and iron hydroxides with an atomic ratio of the cations 1:1 is subjected to mechanochemical activation, then calcined at 600° C. for 4 hours. Pseudoboehmite, nitric acid, aluminosilicate fiber, and water to a total moisture of 28%, are added to the prepared $Ca_2Fe_2O_5$ powder. Blocks of honeycomb structure are formed, dried and calcined. The composition of the catalyst, % by weight, is: $Ca_2Fe_2O_5$—70, $Al_2O_3$—25, $SiO_2$—5. The catalyst is resistant to thermal shocks.

EXAMPLE 5

A mixture of calcium, lanthanum and cobalt oxides with an atomic ratio of the cations 0.2:0.8:1 is subjected to mechanical activation, and then calcined at 800° C. Pseudoboehmite, chromic acid, and water to a total moisture of 25%, are added to the prepared powder. Blocks of honeycomb structure are formed, dried, calcined. The composition of the catalyst, % by weight, is: $Ca_{0.2}La_{0.8}CoO_3$—70, $Al_2O_3$—20, $Cr_2O_3$—10. The catalyst is resistant to thermal shocks.

EXAMPLE 6

A mixture of calcium carbonate, manganese oxide and ferric oxide is subjected to activation with an atomic ratio of cations 1:0.4:0.6, and then calcined at 700° C. Pseudoboehmite, nitric acid, water, kaolin to a total moisture of 24% are added to the prepared powder. Blocks of honeycomb structure are formed, dried and calcined. The composition of the catalyst, % by weight, is: $CaMn_{0.4}Fe_{0.6}O_3$—70, $Al_2O_3$—25, $SiO_2$—5. The catalyst is resistant to thermal shocks.

EXAMPLE 7

A mixture of calcium and cobalt oxides is subjected to mechanochemical activation, then calcined at 600° C. Chromic acid and glycerin are added to the prepared powder in a mixer to the formation of the paste being formed. Blocks are formed, dried and calcined. The composition of the catalyst, % by weight, is: $CaCoO_{2.97}$—90, $Cr_2O_3$—10. The catalyst is resistant to thermal shocks.

EXAMPLE 8

A mixture of calcium, lanthanum and nickel carbonates is subjected to mechanochemical activation, then calcined at 800° C. Pseudoboehmite, a solution of acetic acid, and aluminosilicate fiber are added to the prepared powder. Paste having a moisture of 26% is formed in the form of microblocks. The catalyst is dried, calcined. The composition of the catalyst, % by weight, is: $Ca_{0.4}La_{0.6}NiO_3$—50, $Al_2O_3$—45, $SiO_2$—5. The catalyst is resistant to thermal shocks.

EXAMPLE 9

Eighty g of ferric oxide, 40 g of aluminum hydroxide and 2 g of aluminosilicate fiber are mixed in a mixer with 25 ml of water, 8 ml of concentrated nitric acid and 2 ml of ethylene glycol to formation of a plastic paste which is formed by the extrusion method in the form of blocks with a wall thickness of 1 mm. The blocks are sun-dried, then the temperature in a drying cabinet is raised to 110° C. and held up to 24 hours. The dried blocks are calcined at 900° C. for 4 hours. The composition of the catalyst, % by weight, is: $Fe_2O_3$—85, $Al_2O_3$—13, $SiO_2$—2. The catalyst can bear 25 heating-cooling cycles.

EXAMPLE 10

The catalyst is prepared in a manner similar to example 9, but acetic acid is used instead of nitric acid. The composition of the catalyst, % by weight, is: ferric oxide—80, aluminum oxide—18, and silicon oxide—2. The catalyst bears 25–30 heating-cooling cycles.

EXAMPLE 11

The catalyst is prepared by mixing 94 g of ferric oxide, 17 g of aluminum hydroxide and 10 g of a 10% solution of zirconium-strontium oxynitrate with a ratio of the cations of zirconium and strontium being 9:1. Water and carboxymethyl cellulose are added to form a plastic paste, it is formed and calcined at 1000° C. The composition of the catalyst, % by weight, is: ferric oxide—94, aluminum oxide—5, and zirconium-strontium oxide—1. The catalyst bears not less than 15 heating-cooling cycles.

EXAMPLE 12

The catalyst is prepared by mixing 75 g of ferric oxide, 10 g of REE oxides, % by weight (lanthanum oxide—30–33, ceryl oxide—45–55, praseodymium oxide—5–6, neodymium oxide—10–13, samarium oxide—1–2, balance lanthanides—not more than 1) and 50 g of aluminum hydroxide with the addition of 10 ml of nitric acid, 1 g of polyethylene oxide and water to form a plastic paste, molded and then calcined at 1100° C. The composition of the catalyst, % by weight, is ferric oxide—75, a mixture of REE oxides—10 and aluminum oxide—15. The catalyst bears 20 heating-cooling cycles.

EXAMPLE 13

Similar to example 9, but a 10% solution of zirconium-strontium oxynitrate is used instead of nitric acid with a ratio of the cations being 9:1. It is calcined at 1000° C. The composition of the catalyst, % by weight, is: ferric oxide—84, aluminum oxide —13, silicon oxide—2 and zirconium-strontium oxide—1. The catalyst bears not less than 32 heating-cooling cycles.

EXAMPLE 14

Eighty g of ferric oxide are mixed with 30 g of aluminum hydroxide, 5 g of a mixture of REE oxides, 5 g of aluminosilicate fiber, 20 ml of water, 8 ml of nitric acid, and 2 ml of ethyleneglycol, blocks are formed, dried, and calcined at 900° C. The composition bears 25 heating-cooling cycles.

A check of the stability of the catalysts in respect of lengthy operation under industrial conditions for three months showed that the catalyst maintains a high level of activity and strength. Furthermore, calculations show that use of an oxide catalyst for ammonia oxidation of regular structure as the second step of a catalytic system makes it possible to reduce the use and loss of platinoids by 30% and 20% respectively. Due to the regular structure, the proposed catalysts make it possible to reduce the gas dynamic resistance of a catalyst layer by 2–3 times as compared with a tableted oxide catalyst, and, consequently, the power consumption for feeding gas into the reactor. The process becomes more stable, there is no overflow of ammonia at all, which enhances the safety. The catalysts are stable to abrupt temperature changes. The proposed catalyst is made from available and cheap stock, without run-offs.

The proposed catalysts may be widely used in industry in the production of nitric acid.

TABLE

Results of tests of catalysts in an ammonia oxidation reaction

| Catalytic system (composition of catalyst) | Speed of flow, V, m/s | Temperature of hot zone, T ° C. | Selectivity, % NO |
|---|---|---|---|
| Example 1 + Pt($Ca_{0.1}La_{0.9}MnO_3$ - 90%, $Al_2O_3$ - 8%, $SiO_2$ - 2%) | 1.25 | 900 | 95.6 |
|  | 1.25 | 940 | 92.5 |
|  | 2.26 | 900 | 92.1 |
| Example 2 + Pt($CaMnO_{2.95}$ - 60%, $Al_2O_3$ - 30%, $SiO_2$ - 10%) | 1.25 | 900 | 94.6 |
| Example 3 + Pt($Ca_{0.5}La_{0.5}FeO_{2.9}$ - 95%, $ZrO_2$ - 5%) | 1.25 | 900 | 92.5 |
|  | 1.72 | 900 | 94.4 |
| Example 4 + Pt($Ca_2Fe_2O_5$ - 70%, $Al_2O_3$ - 25%, $SiO_2$ - 5%) | 1.25 | 940 | 93.2 |
|  | 2.20 | 900 | 92.1 |
| Example 5 + Pt($Ca_{0.2}La_{0.8}COO_3$ - 70%, $Al_2O_3$ - 20%, $Cr_2O_3$ - 10%) | 1.25 | 920 | 91.7 |
|  | 2.26 | 900 | 91.6 |
| Example 6 + Pt($CaMn_{0.4}Fe_{0.6}O_3$ - 70%, $Al_2O_3$ - 25%, $SiO_2$ - 5%) | 2.26 | 900 | 93.1 |
| Example 7 + Pt($CaCoO_{2.97}$ - 90%, $Cr_2O_3$ - 10%) | 2.26 | 900 | 91.0 |
| Example 8 + Pt($Ca_{0.4}La_{0.6}NiO_3$ - 50%, $Al_2O_3$ - 45%, $SiO_2$ - 5%) | 2.26 | 900 | 90.7 |
| Example 9 + Pt (85% $Fe_2O_3$, 13% $Al_2O_3$, 2% $SiO_2$) | 1.25 | 900 | 95.8 |
|  | 0.85 | 950 | 96.3 |
|  | 1.72 | 915 | 96.9 |
| Example 9 | 1.25 | 950 | 82.8 |
|  | 0.85 | 940 | 82.8 |
| Example 10 (80% $Fe_2O_3$, 18% $Al_2O_3$, 2% $SiO_2$) | 1.25 | 935 | 77.7 |
|  | 0.85 | 925 | 77.9 |
| Example 10 + Pt | 1.25 | 920 | 94.5 |
|  | 1.72 | 930 | 94.9 |
|  | 2.25 | 920 | 93.3 |
| Example 11 (94% $Fe_2O_3$, 5% $Al_2O_3$, 1% $ZrO_2$) | 1.25 | 920 | 81.5 |
|  | 1.72 | 940 | 80.5 |
|  | 0.85 | 920 | 85.4 |
|  | 2.25 | 880 | 80.6 |
| Example 11 + Pt | 1.25 | 920 | 94.1 |
|  | 1.72 | 900 | 95.2 |
| Example 12 + Pt | 1.25 | 920 | 94.5 |
|  | 1.72 | 900 | 95.2 |
|  | 1.72 | 950 | 91.3/94.5 |
| Example 12 (75% $Fe_2O_3$, 10% REE oxides, 15% $Al_2O_3$) | 1.25 | 910 | 64.9 |
|  | 0.85 | 1000 | 53.3 |
| Example 13 + Pt (84% $Fe_2O_3$, 13% $Al_2O_3$, 2% $SiO_2$, 1% $ZrO_2$) | 1.25 | 900 | 97 |
|  | 1.25 | 880 | 97 |
|  | 1.72 | 900 | 95.2 |
| Example 13 | 1.25 | 920 | 47 |
|  | 0.85 | 900 | 56 |
| Example 14 + Pt (80% $Fe_2O_3$, 10% $Al_2O_3$, 5% $SiO_2$, 5% REE oxides) | 1.25 | 900 | 82.5 |
|  | 1.72 | 920 | 96.1 |
|  | 2.25 | 900 | 91.4 |

What is claimed is:

1. A catalyst for oxidation of ammonia on the base of oxides, characterized in that the catalyst is a makeup of mixed oxides of the general formula $(A_xB_yO_{3-z})_k (Me_mO_n)_f$, wherein: A is a cation selected from the group consisting of Ca, Sr, Ba, Mg, Be, La and mixtures thereof, B is a cation selected from the group consisting of Mn, Fe, Ni, Co, Cr, Cu, V and mixtures thereof, x=0–2, y=1–2, z=0.8–1.7; $Me_mO_n$ is selected from the group consisting of an aluminum oxide, silicon oxide, zirconium oxide, chromium oxide, aluminosilicates, oxides of rare earth elements (REE) and mixtures thereof, m=1–3, n=1–2, k and f are % by weight, with the ratio f/k=0.01–1.

2. A catalyst according to claim 1, characterized in that it comprises, % by weight:

| | |
|---|---|
| ferric oxide | 70–94, |
| aluminum oxide | 1–29, |
| silicon oxide, REE oxides, zirconium oxide or mixtures thereof | 1–29. |

3. A catalyst according to claim 2, characterized in that the catalyst is in the form of granules.

4. A catalyst according to claim 1, characterized in that the REE oxides may be both pure oxides and also an undivided mixture (metal mixture) of oxides of rare earth elements of the following composition, % by weight:

| | |
|---|---|
| lanthanum oxide | 30–33, |
| ceryl oxide | 45–55, |
| praseodymium oxide | 5–6, |
| neodymium oxide | 10–13, |
| samarium oxide | 1–2, |
| balance lanthanides | not more than 1. |

5. A catalyst according to claim 4, characterized in that the catalyst is in the form of granules.

6. A catalyst according to claim 1, characterized in that the zirconium oxide additionally comprises an alkaline-earth metal, wherein the ratio of zirconium to the alkaline-earth metal in the zirconium oxide is 9:1.

7. A catalyst according to claim 6, characterized in that the catalyst is in the form of granules.

8. A catalyst according to claim 1, characterized in that the catalyst is in the form of granules.

\* \* \* \* \*